United States Patent [19]

Belgin

[11] Patent Number: 5,220,681

[45] Date of Patent: Jun. 15, 1993

[54] ELECTRONIC SIGNAL DECODER DISPLAY/ENUNCIATOR APPARATUS FOR ELECTRONIC SIGNAL RECEIVERS

[75] Inventor: Michael F. Belgin, Indialantic, Fla.

[73] Assignee: Multi-Leasing Services Inc., Satellite Beach, Fla.

[21] Appl. No.: 315,843

[22] Filed: Feb. 27, 1989

[51] Int. Cl.$^5$ ............................................. H04B 1/16
[52] U.S. Cl. ................................ 455/156.1; 455/38.4; 455/214; 455/243
[58] Field of Search ............... 455/156, 161, 166, 188, 455/186, 228, 214, 343, 67, 205, 38.4, 156.1, 67.3, 161.3, 186.1, 166.1, 188.1; 375/94

[56] References Cited

U.S. PATENT DOCUMENTS

| | | | |
|---|---|---|---|
| 3,859,475 | 1/1975 | Wulfsberg et al. | 455/38.4 |
| 4,161,708 | 7/1979 | Friberg et al. | 455/154 |
| 4,267,597 | 5/1981 | Volpi et al. | 455/154 |
| 4,435,843 | 3/1984 | Eilers et al. | 455/228 |
| 4,648,101 | 3/1987 | Hamzaoui et al. | 375/94 |
| 4,742,564 | 5/1988 | Dumont | 455/186 |
| 4,862,513 | 8/1989 | Bragas | 455/228 |
| 4,879,758 | 11/1989 | DeLuca et al. | 455/186 |
| 4,887,308 | 12/1989 | Dutton | 455/156 |
| 4,955,080 | 9/1990 | Wagai et al. | 455/228 |

Primary Examiner—Reinhard J. Eisenzopf
Assistant Examiner—Edward Urban
Attorney, Agent, or Firm—Evenson, Wands, Edwards, Lenahan & McKeown

[57] ABSTRACT

A decoding and display mechanism that may be integrated with avionics, navigation and communications equipment whose encoded audio output is normally monitored directly through the pilot's headset. The encoded audio signal is coupled through a programmable bandpass filter to remove potentially contaminating noise signals, particularly human voice signals, that might otherwise prevent successful decoding of the superimposed (e.g. Morse) code. The filtered encoded audio signal is then coupled to a (microprocessor-based) decoder which decodes the symbols of the encoded tone and generates a set of output signals representative of the alpha-numeric abbreviation of the source of the channel being monitored. This set of output signals is then used to drive a digital display (or other humanly perceptible indicator, such as a synthesized voice enunciator), so that the pilot may be provided with the identification of the source of the monitored channel. The present invention may be integrated within other types of radio equipment, such as amateur radio short wave receivers, to facilitate signal decoding by the operator/listener. The decoded output may be selectively coupled to the receiver's existing display through which the frequency to which the radio is tuned is indicated, and/or through a voice synthesizer to an output speaker.

6 Claims, 4 Drawing Sheets

ELECTRONIC SIGNAL DECODER DISPLAY/ENUNCIATOR APPARATUS FOR ELECTRONIC SIGNAL RECEIVERS

FIELD OF THE INVENTION

The present invention relates in general to communication system and is particularly directed to an apparatus for decoding and displaying encoded information signals that are contained within, or modulated on, a radio signal, such as the station identifier (Morse) code that is superimposed on an avionics navigation aid signal.

BACKGROUND OF THE INVENTION

Present day aerial radio communication systems, such as navigation and communication systems, distance measuring equipment, navigation aid systems, etc. customarily provide a cockpit console visual display of the frequency of the (navigation) channel to which an avionics receiver is tuned. In addition, they supply an audio output (in the form of a (Morse) encoded station identifier code) representative of the source (the transmitting station) of the monitored frequency, which has been superimposed or modulated onto the navigation signal. By listening to, mentally decoding, and/or referring to a published decoding reference, the series of dots and dashes of which the encoded signal is comprised, the pilot may determine the alpha-numeric abbreviation of the identification of the transmitting station. Given the fact that the degree of concentration required by the pilot in flying the aircraft is already considerable, it goes without saying that a mechanism that is capable of alleviating the pilot of this potentially distracting, code-deciphering burden would add an additional safety factor to the control of the aircraft. Now although there do exist Morse code-type trainer/monitor units, that are designed as desktop, stand-alone devices, and not as avionics-integrated subsystems, such devices are both physically incompatible with the cockpit environment and lack requisite noise immunity.

More particularly, presently commercially available code reader and display units, such those configured and functioning in the manner of the AR-501 Radio Telegraph Terminal, manufactured by AOR, Ltd. Japan or the Code*Star code reader, manufactured by Microcraft Corp., Mequon, Wisconsin, are designed to b used with commercial radio receivers for "off the air reception" or for personal telegraph Morse code training, and require that the code-modulated input frequency be an effectively 'clean' noise (particularly voice)-free signal. Voice signals that are often present on an avionics communications channel, which such 'trainer'-type decoder units are not designed to monitor, effectively prevent these types of units from generating a useful output, as the decoding circuitry attempts to respond to and decode the characteristics of the voice signal, and essentially locks up, generating no output.

SUMMARY OF THE INVENTION

In accordance with the present invention, the above discussed decoding exercise, that has been conventionally performed mentally by the pilot, and cannot be successfully accomplished by conventional desk-top telegraph devices (due to the presence of contaminating noise (e.g. human voice)), is accomplished automatically by a decoding and display/enunciator system that may be readily integrated with the avionics systems of the aircraft, thereby augmenting the performance of on-board navigation and communications control equipment and facilitating in flight-operation of the aircraft.

For this purpose, the present invention comprises a decoder and display unit that ma be coupled with existing navigation, communications equipment whose encoded output signal is normally monitored directly through the pilot's headset, or another output speaker. Pursuant to the invention, the encoded signal is coupled to a tunable filter/frequency discriminator unit which contains a programmable, tunable filter/frequency discriminator unit that monitors and may be programmed to scan prescribed frequency bands for one or more predefined frequencies of interest (e.g. navigation frequencies of 400, 880, 1020 and 1350 KHz). The unit can also be programmed to scan prescribed frequency bands. Once the tunable filter/frequency discriminator unit has acquired one of these frequencies, it extracts the encoded modulation in the form of a corresponding pulse width modulated signal, which is forwarded to an associated processor (microcontroller), wherein it is decoded. Because the tunable filter/frequency discriminator unit is frequency sensitive, it effectively filters out potentially contaminating noise signals, particularly human voice signals, which might otherwise prevent successful decoding of the superimposed (e.g. Morse) code.

The processor, or microcontroller, generates output signals representative of the alpha-numeric abbreviation of the source of the signal being monitored, which are coupled to a digital display (or other humanly perceptible indicator, such as a synthesized speech enunciator), so that the pilot may be provided with the identification of the navigation aid transmitting station. As an additional feature, the system may be programmed to monitor loss of signal, and generate a (visual/audible) loss of station warning.

In addition to its capability of augmenting the functionality and performance of avionics equipment, the present invention ma be integrated within other types of radio equipment, such as amateur radio short wave receivers, to facilitate signal decoding by the operator/listener. The decoded output may be selectively coupled to the receiver's existing display through which the frequency to which the radio is tuned is indicated, or through a voice synthesizer to an output speaker.

DETAILED DESCRIPTION

Figure 1:
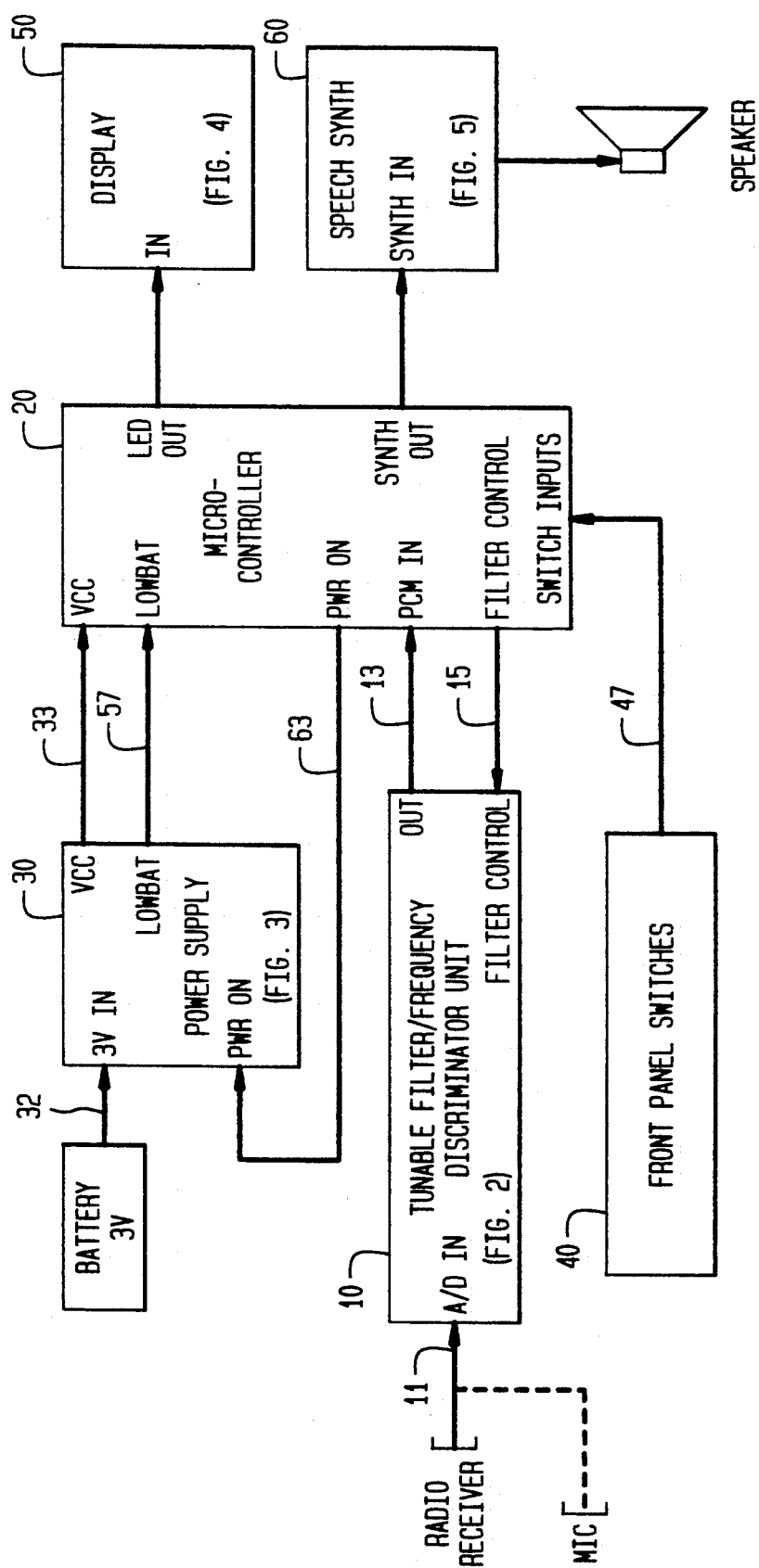
FIG. 1 diagrammatically illustrates the overall configuration of a decoder and display/enunciator apparatus in accordance with the present invention.

Before describing in detail the particular decoding and display/enunciator apparatus in accordance with the present invention, it should be observed that the invention resides primarily in a novel structural combination of conventional communication and signal processing circuits and components and not in the particular detailed configurations thereof. Accordingly, the structure, control and arrangement of these conventional circuits and components have bee illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the FIGS. do not necessarily represent the mechanical structural arrangement of the exemplary system, but are primarily intended to illustrate the major structural components of the system in a convenient functional grouping, whereby the present invention may be more readily understood.

Referring now to FIG. 1, a diagrammatic illustration of the overall configuration of a decoder and display/enunciator apparatus in accordance with the present invention is shown as comprising a processor-programmable, tunable filter/frequency discriminator unit 10 (illustrated in detail in FIG. 2), having a signal input port 11 coupled to receive an analog signal, such as that capable of being received and demodulated by a conventional radio wave signal receiver device, such as a navigation aid receiver, consumer (short wave) radio, etc., which may contain voice, code modulation (frequency and/or amplitude) and noise components. Input port 11 of tunable filter/frequency discriminator unit 10 may optionally be coupled to an analog signal input device, such as a microphone (shown in broken lines), for monitoring the speaker output of a separate receiver unit. Tunable filter/frequency discriminator unit 10 produces, on an output link 13, a pulse width modulation signal which is representative of the encoded modulation of the analog input signal, but is absent any voice/noise components that may be contained within the analog input signal. As will be explained below with reference to FIG. 2, tunable filter/frequency discriminator unit 10 is programmed by way of a control link 15 from an associated control processor (microcontroller) 20 to scan a range of frequencies ( e.g. 350–1500 KHz) and to lock on to one or more frequencies (e.g. aviation navigation frequencies of 400, 880, 1020 and 1350 KHz) within the scanned range.

Figure 2:
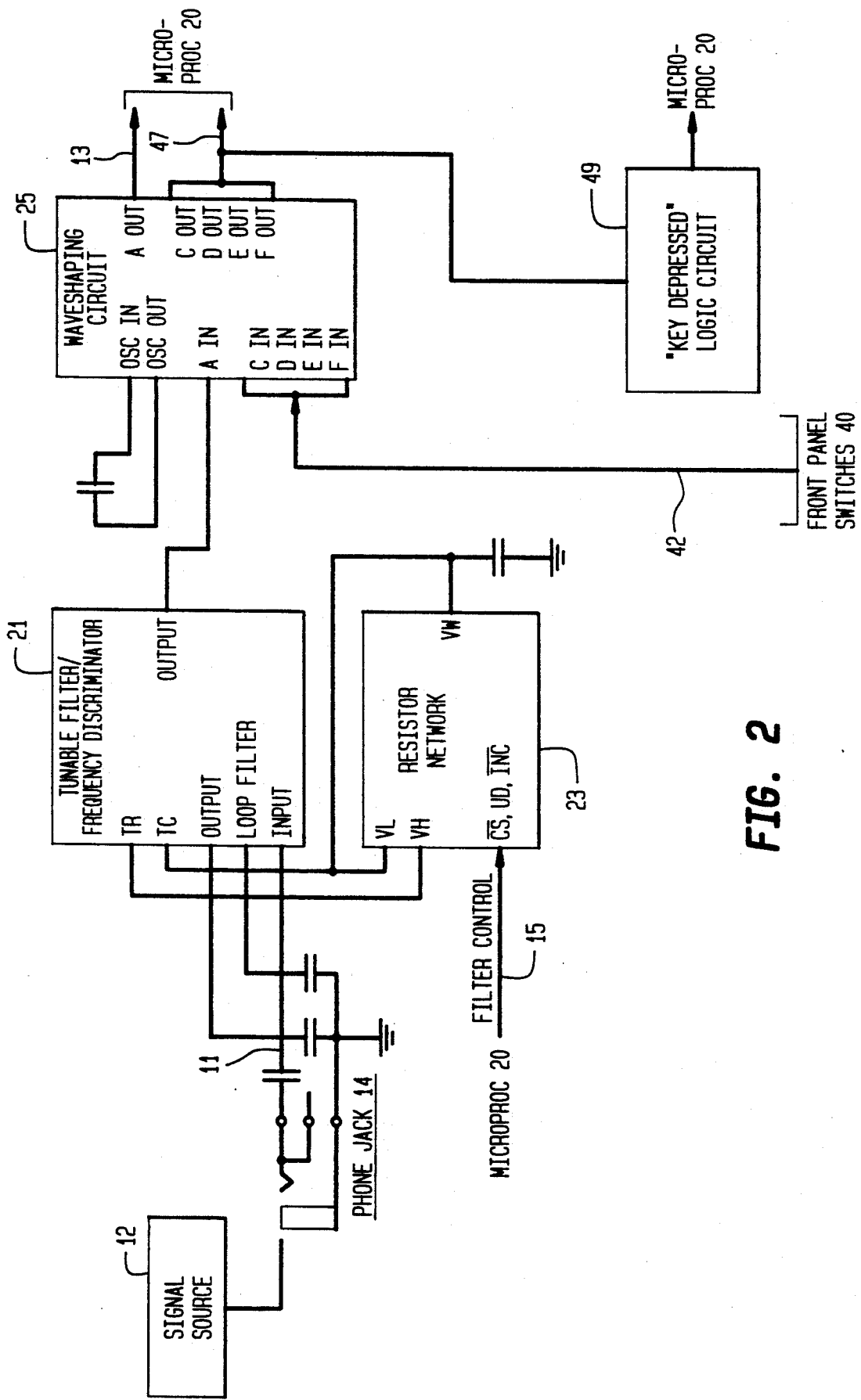
FIG. 2 diagrammatically illustrates the configuration of tunable filter/frequency discriminator unit 10 of the system diagram of FIG. 1.
Figure 3:
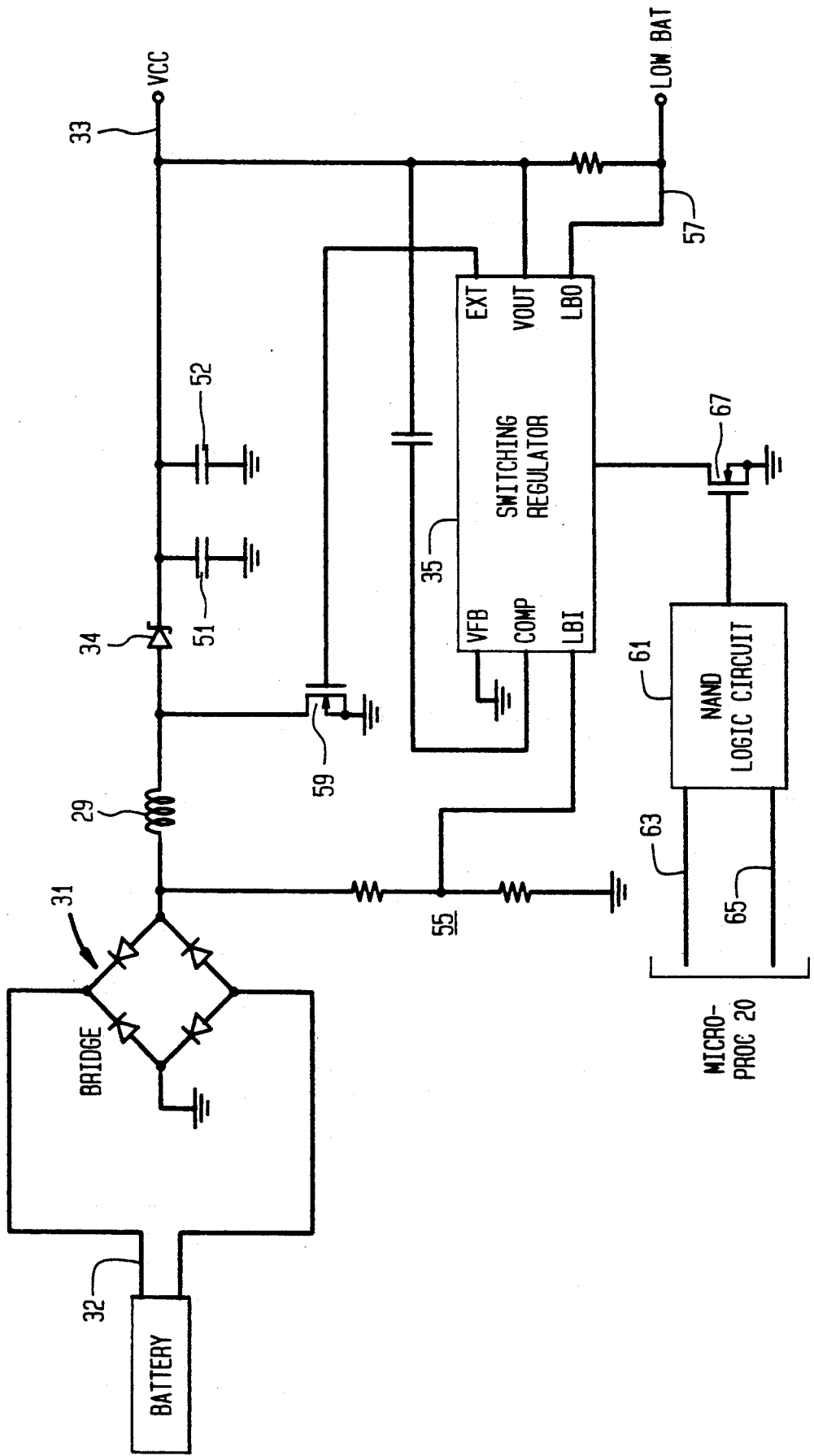
FIG. 3 diagrammatically shows the make-up of power supply 30 of the system diagram of FIG. 1.

Microcontroller 20 preferably comprises a single chip, programmable microprocessor, which is powered by a battery life-conserving power supply 30, shown in detail in FIG. 3, and external input commands for which are provided by way of a switch panel 40, having switch input connections shown in FIG. 2. Microcontroller 20 decodes the pulse width modulated code input signal supplied from tunable filter/frequency discriminator unit 10 and generates output signals through which an alpha-numeric representation of the decoded signal (e.g. navigation signal transmitter station identifier) may be visually displayed by way of a display unit 50 (e.g. an LED or LCD display unit), shown in FIG. 4, and/or an audible message verbalized to the system user by way of a speech synthesizer 60 (shown in FIG. 5) and an associated speaker or headset. In addition to controllably defining the operational settings of tunable filter/frequency discriminator unit 10 (via link 15), decoding its pulse width modulated output signals and generating a 'human-perceptible' (visually displayed by display unit 50 or verbalized by speech synthesizer unit 60) representation of the decoded tone signals, microcontroller 20 monitors the operation of tunable filter/frequency discriminator unit 10 and the 'health' of power supply 30. In the event of an anomaly (e.g. loss of signal by tunable filter/frequency discriminator unit 10 or inadequate power supply voltage), it causes a 'warning' message to be generated.

Referring now to FIG. 2, tunable filter/frequency discriminator unit 10 is shown as comprising a tunable filter/frequency discriminator 21, having its signal input port 11 coupled to an analog signal source 12, such as one of the above-mentioned radio wave receiver devices, through an interconnect element, such as a conventional phone jack, as shown at 14. It should be observed that neither the particular interconnect component through which signals of interest are monitored (e.g. phone jack 14), nor the type of device sourcing those signals (e.g. an avionics navigation receiver), is critical to the functionality and operation of the invention and, as, mentioned above, may include any of a variety of devices that are capable of providing such signals, such as avionic, consumer (e.g. short wave radios), commercial and military radio signal sources. In other words, the invention may be used in conjunction with any communications equipment that is capable of receiving an encoded tone signal of interest. As one example, in the case of its use with a conventional radio receiver, input port 11 would be coupled to the output of the receiver's IF stage. In addition, the format of the original signal is not crucial to system operation. For example, the system may be interfaced with an audio signal (such as the speaker output of a radio receiver) by means of a microphone pick-up to input port 11.

The operational range of (a relaxation oscillator within) tunable filter/frequency discriminator is controllably established by way of an RC circuit that includes a programmable resistor network 23, inserted resistor values of which are controllably defined by way of microcontroller 20, via link 15. As pointed out above, for a representative operational navigation aid frequency range from 350 to 1500 KHz., resistor network 23 may be programmed to provide frequency settings at 400, 880, 1020 and 1350 KHz. However, it should be observed that operation of the invention is not limited to this or any particular range, or frequencies within such a range. Because tunable filter/frequency discriminator 21 is frequency selective, it effectively filters out potentially contaminating voice and noise signals, edge transitions of which might otherwise trigger an attempt by microcontroller 20 to decode such (filtered-out) signals. The output of tunable filter/frequency discriminator 21 is coupled to a wave shaping circuit 25 which provides a 'clean edged' (an effectively pulse width modulated) signal that is coupled over link 13 to be read by microcontroller 20.

Also coupled to wave shaping circuit 25 are a set of panel switch lines 42 from the switches of front panel 40, through which external commands for system operation may be input by the user. Switch lines 42 are coupled to a wave shaping (debounce) circuit 45, which may be included as part of wave shaping circuit 25, output lines 47 of which coupled to microcontroller 20 and, additionally, to a 'key depressed' logic circuit 49, which couples an output over link 51 as an externally generated interrupt to microcontroller 20 whenever any front panel switch is actuated. The front panel switches may be employed to externally control a number of operational parameters of the system, such as whether to display station identification or the actual code contained within the monitored signal of interest, display intensity, the intensity of the audio output of speech synthesizer 60, etc. As in the case of other operational aspects of the system, such as the frequency spectrum boundaries delineated above, neither the type nor number of parameters that are controlled by way of the switch panel 40 are to be considered limited to the examples presented here. Control adjustments are readily effected by way of a straightforward modification of the control software through which microcontroller 20 supervises operation of the system.

Power for the system is supplied by a battery-conserving step-up power supply 30, shown in detail in FIG. 3 as including a (polarity guard) full wave bridge rectifier 31, which is coupled between (3V) battery input terminals 32 and (5V) output terminal 33, from which the supply rail voltage (Vcc) for the various integrated circuit components of the systems is derived (by way of a series connection of inductance 29 and rectifier 34, the output of which is coupled to grounded capacitors 51 and 53). Bridge rectifier 31 is coupled through voltage divider network 55 to a low battery input terminal LBI of a switching regulator 35. Switching regulator 35 functions as a power supply supervisory circuit, monitoring adequacy of the battery voltage and providing a 'low battery' output signal over link 57, if there is insufficient power supplied from the battery to maintain the requisite 5V (Vcc) for system operation. A current switching FET 59 has its source-drain path coupled between connection of inductor 29 and diode 34 and ground, and its gate coupled to the EXT output of switching regulator 35. Under the control of switching regulator 35, FET 59 controls the duration of current flowing through inductor 29, thereby effecting power supply regulation. Specifically, FET 59 controls the width of the switched pulsed current through inductor 29. For lower current values, the pulse width is narrow, thus conserving power; the pulse width increases with increasing current drain or demand. As a consequence, during system idle periods and in the event the supply battery is insufficient to provide a 5V output on supply link 33, the output of the power supply is reduced to 3V, so as to maintain minimum microprocessor functionality (e.g. storing of input data supplied by tunable filter/frequency discriminator unit 10).

Power supply 30 is controllably turned on and off by way of NAND logic circuit 61, a first input to which is coupled over link 63 from microcontroller 20 and a second input of which is coupled over link 65 from a switch on front panel 40, so that the output of the power supply ca be controllably reduced during an idle or quiescent state. The output of NAND circuit 61 is coupled to FET switch 67, which is coupled to the enable input of switching regulator 35, for controllably turning the power supply on (full 5V output state) and off (reduced 3V output state). When the system is placed into operation, activation of a POWER-ON front panel switch causes a signal to be asserted on link 65, which 'wakes up' the processor and powers-up the unit. Link 63 is similarly used by microcontroller 20 to reduce power to 3V in response to a low battery output signal on link 57.

Figure 4:
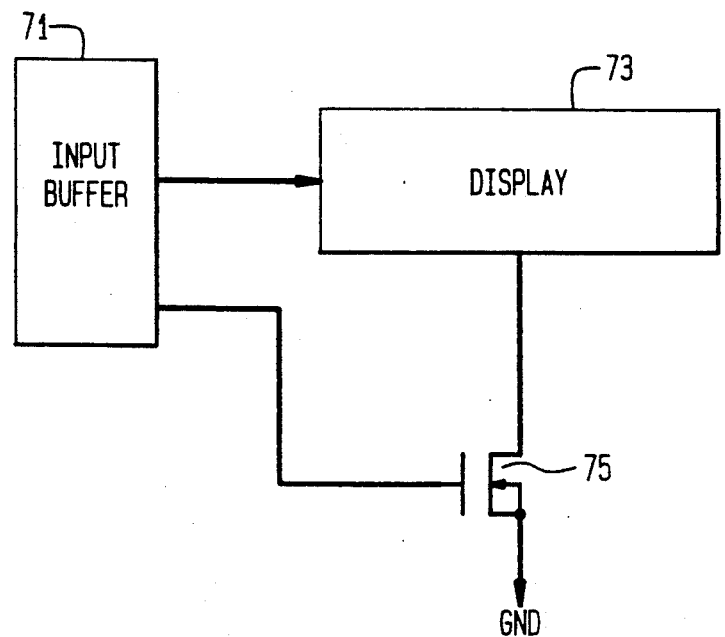
FIG. 4 shows the details of display unit 50 of the system diagram of FIG. 1.

Referring now to FIG. 4, a display unit 50 (such as an LED or LCD display unit) is shown as comprising a data/control signal interface buffer 71 coupled between microcontroller 20 and a multi-character, alphanumeric display unit 73 (e.g. containing a set of 5×7 dot matrix display elements and associated drivers), the drive enable inputs of which are controllably switch FET 75. Buffer 71 interfaces both data and control signals from microcontroller 20 for selectively energizing and controlling the intensity of the illumination (reduced during idle periods) of the individual elements of the display unit.

Figure 5:
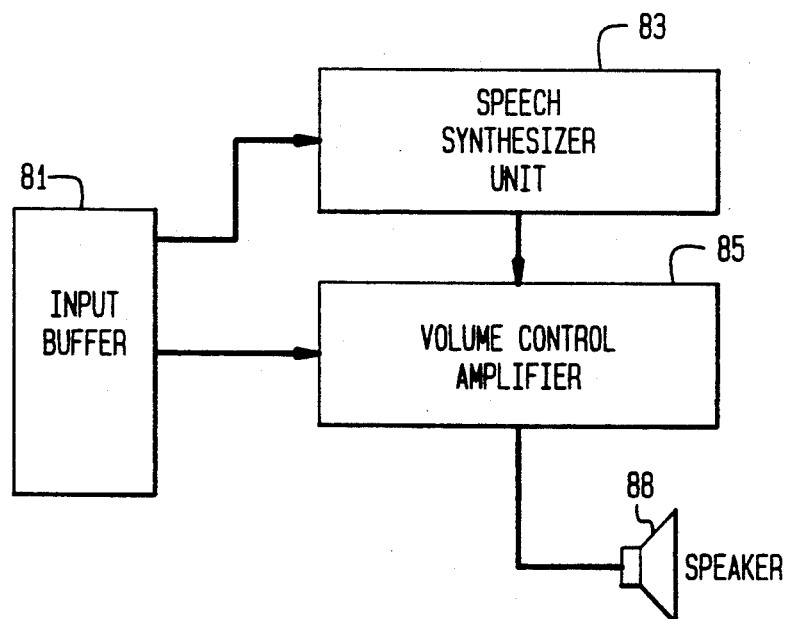
FIG. 5 shows the details of speech synthesizer 60 of the system diagram of FIG. 1.

Similarly, as shown in FIG. 5, speech synthesizer 60 comprises a data/control signal interface buffer 81 for interfacing data signals with a (phoneme-based) speech synthesizer unit 83 and audio volume control signals with a volume control amplifier 85, which is coupled to receive the synthesized voice output signals from unit 83 and outputs a 'verbalized' message to an audio output device, such as a speaker, shown at 87, or other functionally equivalent device (e.g. headset).

OPERATION

In the description of the operation of the invention to follow reference will be made principally to the manner in which microcontroller 20 responds to input commands and signals provided by respective sections of the overall system illustrated in FIG. 1. Rather than set forth the details of that control program here, the present description will focus upon the interaction of the system components with one another in the course of the monitoring and displaying of the decoded modulation of a signal of interest. For details of the control program itself attention may be directed to source code listing of the attached Appendix.

As pointed out above, and although not limitative of the invention, one application with which the decoder/display arrangement of the present invention has particularly utility is cockpit console-mounted avionics hardware, such as navigation aid and distance measuring equipment. For purposes of the present description, it will be assumed that the invention is installed in such an environment. The configuration of the hardware itself may vary; the inventive system may be integrated as part of an avionics unit (and powered internally by that unit's internal power supply) or, alternatively, it may be housed in a self-contained, battery powered modular unit that may be affixed, by way of a suitable mounting bracket, to the cockpit console, with input port 11 plugged into the output jack of the channel monitoring avionics, so that tunable filter/frequency discriminator unit unit 10 will receive directly the encoded tone of interest. In the present example, it will be assumed that the unit is powered by a self-contained (3V) battery unit.

Initially, with the unit in its quiescent or idle state, actuating a POWER-ON switch on front panel 40 causes a 'wake-up' signal to be coupled over link 42, through de-bounce circuit 45, to microcontroller 20. In response to this 'wake-up' signal, microcontroller 20 supplies a 'power-up' signal over link 63 to NAND logic circuit 61 of power supply unit 30, which switches power supply supervisory switching regulator 35 from its low voltage (3V) mode to its (5V) full operational mode, so that the system becomes fully operational. Depending upon the operational parameters of the apparatus, that are externally presettable by the operation of the switches on front panel 40, microcontroller 20 supplies the appropriate control signals for the various units of the system (including adjustment of the settings of resistor network 23 for tunable filter/frequency discriminator 21, to establish the frequency range and specified frequencies to be scanned by tunable filter/frequency discriminator unit 10).

Tunable filter/frequency discriminator unit 10 continuously scans the respective frequency channels that may be monitored by the associated avionics equipment, (e.g. navigation frequencies of 400, 880 1020 and 1350 KHz.), until it acquires a signal of sufficient strength to be decoded. The code modulations of the monitored frequency are supplied as a pulse width modulated signal over link 13 to microcontroller 20, wherein they are decoded. In response to the decoded signal microcontroller 20 generates an (alpha-numeric representative) output signal, which is coupled to display section 50 or synthesized speech unit 60, respectively, so that the pilot may be apprised of the encoded information contents of the navigation aid signal being monitored. Typically, the encoded information is in the form of a Morse code tone modulation superimposed on the navigation aid beacon that identifies the station that is transmitting the navigation aid signal being monitored. While the output signal generated by microcontroller 20 is preferably an alpha-numeric code (station identification) representative signal, so that what is displayed by display unit 50 or enunciated to the pilot via speech synthesizer 60 is in such an alpha-numeric format, microcontroller 20 may be suitably programmed to cause display unit 50 to display the identification signal in accordance with the coded format.

As pointed out above, one of the features of the present invention that enables it to be successfully employed with existing radio (e.g. avionics navigation) equipment is the fact that tunable filter/frequency discriminator unit 10 contains a frequency sensitive decoder, which filters out signals that would otherwise contaminate the decoding process and thereby effectively prevents unwanted signal transitions (such as human voice spikes) from being recognized as an encoded signal, so as not to cause misoperation of the system.

Preferably that portion of the control program which supervises the frequency scan operation of tunable filter/frequency discriminator unit 10 causes a prescribed warning message to be generated (e.g. a "loss of station" announcement verbalized by speech synthesizer unit 60) in the event of loss of signal or a signal that is too weak to detect. Similarly, as pointed out previously in connection with the description of FIG. 3, in the event of a battery drain, the control program within microcontroller 20 causes the system to be powered down to a minimum functionality level (3V), while generating a corresponding alert message to the user.

As will be appreciated from the foregoing description, the present invention provides a mechanism for automatically performing a signal monitoring and decoding exercise which, in an avionics environment, has been conventionally performed mentally by the pilot and, due to the presence of contaminating noise (e.g. human voice signals) cannot be successfully accomplished by conventional desk-top telegraph devices, by means of a decoding and display/enunciator system that may be readily integrated with the avionics systems of the aircraft, thereby augmenting the performance of on-board navigation an communications control equipment and facilitating in flight-operation of the aircraft. Advantageously, because the present invention is not hardware intensive, it may be readily coupled with existing navigation, communications equipment, either as a stand-alone unit or integrated with the receiver circuitry.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. For use with a navigation aid radio apparatus for receiving navigation air radio communication signals containing encoded information signals superimposed thereon representative of the identification of a station transmitting navigation aid radio communication signals, which encoded information signals, when applied to a transducer from which a humanly perceptible output is producible in response thereto, cause said transducer to generate an output containing said encoded information signals in a format that is humanly perceptible, an arrangement for decoding said information signals and generating a humanly perceptible output representative of the identification of said transmitting station comprising:

first means for deriving from said navigation aid radio communication signals first output signals representative of said encoded information signals absent other information signals that may be contained in said navigation aid radio communication signals;

second means, coupled to said first means, for decoding encoded information contained in said first output signals derived by said first means and producing second output signals representative of the identification of said transmitting station;

third means, coupled to said second means, for generating a humanly perceptible indication of the identification of said transmitting station; and fourth means for supplying electrical power for the operation of said arrangement from a battery power supply.

2. An arrangement according to claim 1, wherein said third means comprises means for providing at least one of a visual display and a synthesized voice indication of the identification of said transmitting station.

3. An arrangement according to claim 2, wherein said third means comprises means for providing an alpha-numeric identification of said transmitting station.

4. An arrangement according to claim 1, wherein said fourth means includes means for monitoring the electrical output of said battery power supply and causing said second means to generate a third output signal representative of a low battery condition in response to detecting the electrical output of said battery power supply dropping to a prescribed reduced level, said third output signal being coupled to said third means, in response to which said third means generates a humanly perceptible warning indication representative of said low battery condition.

5. An arrangement according to claim 1, wherein said first means comprises a tunable filter/frequency discriminator unit coupled to derive from said navigation aid radio communication signals pulse width modulated signals representative of the identification of said transmitting station, and wherein said second means comprises digital signal processing means, coupled to receive said pulse width modulation signals derived by said tunable filter/frequency discriminator unit and generating said second output signals in accordance with said pulse width modulated signals.

6. For use with an apparatus for receiving communication signals containing encoded information signals superimposed therein, which encoded information signals, when applied to a transducer from which a humanly perceptible output is producible in response thereto, cause said transducer to generate an output containing said encoded information signals in a format that is humanly perceptible, an arrangement for decoding said information signals and generating a humanly perceptible output representative thereof comprising:

first means for deriving from said communication signals first output signals representative of said encoded information signals absent other information signals that may be contained in said communication signals;

second means, coupled to said first means, for decoding encoded information contained in said first output signals derived by said first means and producing second output signals representative of said encoded information; and third means, coupled to said second means, for generating a humanly perpceptible indication of said decoded information; and wherein said apparatus comprises a navigation aid signal monitoring receiver which provides, as an output, a visual display of the navigation channel to which the receiver is tuned and an output signal containing said encoded information signals identifying the station from which the navigation channel being monitored is being transmitted, and wherein said first means is coupled to derived said encoded information signals from said station identifying output signal.

* * * * *